(12) United States Patent
Kimura

(10) Patent No.: US 7,776,995 B2
(45) Date of Patent: Aug. 17, 2010

(54) PROCESS FOR PRODUCTION OF POLYESTER PARTICLES, POLYESTER PARTICLES, POLYESTER RESIN PARTICLES, AND PROCESS FOR PRODUCTION THEREOF

(75) Inventor: Hisashi Kimura, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 276 days.

(21) Appl. No.: 11/912,604

(22) PCT Filed: Apr. 27, 2006

(86) PCT No.: PCT/JP2006/308868
§ 371 (c)(1),
(2), (4) Date: Oct. 25, 2007

(87) PCT Pub. No.: WO2006/118209
PCT Pub. Date: Nov. 9, 2006

(65) Prior Publication Data
US 2009/0068467 A1 Mar. 12, 2009

(30) Foreign Application Priority Data
Apr. 27, 2005 (JP) .............................. 2005-128890

(51) Int. Cl.
*C08G 63/183* (2006.01)
*C08G 63/80* (2006.01)
(52) U.S. Cl. .................. 528/308.3; 428/402; 528/308.4
(58) Field of Classification Search ................. 428/402; 528/308.3, 308.4
See application file for complete search history.

(56) References Cited

U.S. PATENT DOCUMENTS

| 4,161,578 | A | * | 7/1979 | Herron ..................... 528/308.5 |
| 4,180,539 | A | | 12/1979 | Clarke |
| 4,436,782 | A | * | 3/1984 | Ho .............................. 428/402 |
| 5,021,201 | A | * | 6/1991 | Eguchi et al. ................... 264/9 |
| 5,342,557 | A | * | 8/1994 | Kennedy ........................ 264/8 |
| 5,540,868 | A | * | 7/1996 | Stouffer et al. ................. 264/13 |
| 5,714,262 | A | * | 2/1998 | Stouffer et al. .............. 428/402 |

FOREIGN PATENT DOCUMENTS

| JP | B-50-024359 | 8/1975 |
| JP | A-51-066346 | 6/1976 |
| JP | B-55-016806 | 5/1980 |
| JP | 7 1447 | 1/1995 |
| JP | 8 80525 | 3/1996 |
| JP | 10-081739 A * | 3/1998 |
| JP | A-10-512510 | 12/1998 |
| JP | 11 254431 | 9/1999 |
| JP | 2993369 | 10/1999 |
| JP | 2003 266431 | 9/2003 |
| JP | 2005 41903 | 2/2005 |
| WO | WO 2004/035284 A1 | 4/2004 |

* cited by examiner

*Primary Examiner*—H. (Holly) T Le
(74) *Attorney, Agent, or Firm*—Oblon, Spivak, McClelland, Maier & Neustadt, L.L.P.

(57) ABSTRACT

The present invention relates to a process for producing polyester particles, wherein the process includes: (1) discharging a molten polyester having a melt viscosity of from 0.5 Pa·s to 50 Pa·s from a die hole thereby creating polyester strands; (2) bringing the polyester strands into contact with a liquefied fluid for cooling to lead the strands to a cutter together with the liquefied fluid; and (3) cutting the polyester strands led to the cutter; wherein steps (1) to (3) are carried out sequentially and the drawing rate ratio of the polyester strands is from 1.5 to 100 and represented by the following formula: drawing rate ratio=(linear velocity of strands immediately before cut (v2 (m/s)))/(linear velocity of molten polyester when discharged from die hole (v1 (m/s))).

20 Claims, No Drawings

PROCESS FOR PRODUCTION OF POLYESTER PARTICLES, POLYESTER PARTICLES, POLYESTER RESIN PARTICLES, AND PROCESS FOR PRODUCTION THEREOF

TECHNICAL FIELD

The present invention relates to a process for producing polyester particles with a low degree of polymerization and polyester particles, and further relates to a process for producing polyester resin particles by solid phase polycondensation of the polyester particles and polyester resin particles. More particularly, it relates to a process of forming a polyester with a low degree of polymerization to strands and then cutting the strands, capable of producing polyester particles stably at a high speed, and polyester particles which have a substantially cylindroid shape. Further, it relates to a process for efficiently producing polyester resin particles with a high degree of polymerization excellent in processability, which comprises subjecting the above polyester particles with a small particle size, having a substantially cylindroid shape and suitable for solid phase polycondensation at a high speed, to solid phase polycondensation, and polyester resin particles.

BACKGROUND ART

A polyester represented by a polyethylene terephthalate is excellent in mechanical properties, thermal properties, electrical properties, etc. and is thereby widely used for fibers and for molded products such as films, sheets and bottles for various applications and its demand is expanding. A polyester to be used for such applications is usually produced by subjecting a dicarboxylic acid and/or its ester-forming derivative and a diol to esterification and/or ester exchange reaction and then melt polycondensation reaction, and as the case requires, further to solid phase polycondensation.

A polyester after the melt polycondensation reaction is usually granulated to particles with a particle size of from about 1 mm to about several mm so as to be formed into a product or to be subjected to solid phase polycondensation. As a granulation method, usually, a method (hereinafter sometimes referred to as a "strand cutting method") of discharging a melt polycondensed polyester from a die plate having a plurality of pores (die holes) into a gas phase to form the polyester into strands, and subsequently cutting the strands by a fixed blade and a rotary blade having a rotation axis substantially at a right angle to the discharge direction under cooling with water or after cooling with water, is excellent in view of production efficiency and is commonly conducted.

However, when a polyester having a relatively low intrinsic viscosity after the melt polycondensation reaction, for example, an intrinsic viscosity of at most about 0.3 dL/g, is to be granulated in order that the polyester is used for special purpose or to be subjected to solid phase polycondensation, the polyester can hardly be wound in the form of strands since it has a low melt viscosity, and the strands after cooled are fragile, and accordingly granulation by the above strand cutting method has been known to be very difficult. Therefore, as a method of granulating such a polyester having a low intrinsic viscosity, for example, Patent Documents 1 and 2 propose granulation method other than the strand cutting method.

Further, as an improved strand cutting method, Patent Document 3 discloses a method of extruding a large number of strands of a molten thermoplastic resin material from multiple die toward an inclined trough including a coolant stream to bring the strands into contact with water in the trough, carrying the strands downward by the stream to rapidly cool the stands and then cutting the strands into particles by a strand cutter. The document discloses a method wherein the linear velocity of the coolant stream flowing down the trough is higher than the linear velocity of the strands extruded from the die, and the edge of strands newly formed which have passed through the strand cutter connected to the edge of the tough directly with the strands are made to pass through an apparatus along a flow path similar to the flow path of preceding strands.

The above disclosed method is a method excellent for forming (pelletizing) a thermoplastic resin material as a common molding material into particles, but by this method, strands of a polyester low polymer having a very low melt viscosity will not stably run, and formation into particles is difficult. Further, particles to be subjected to solid phase polycondensation are required to have a small particle size so as to increase the solid phase polycondensation reaction rate, but with the technique disclosed, it is further difficult to obtain particles with a small particle size.

Patent Document 4 discloses a method of stretching a ribbon, gut or sheet of a polyester with a low degree of polymerization having an intrinsic viscosity of from 0.32 to 0.40 dL/g between rolls with a draw ratio less than 2 times, followed by cutting. In this method, as shown in FIGS. 1 and 2 of the Patent Document 4, the range of the proper draw ratio is very narrow at an intrinsic viscosity of at most 0.35, and this method can not be employed for practical use.

Further, Patent Document 5 discloses a method of forming a molten polymer containing a polyester as the main component to a molding material in the form of pellets, which comprises cooling molten polymer strands discharged from an outlet in the air for from 0.10 to 0.50 seconds and then bringing them into contact with cooling water and solidifying them to form pellets. However, by the method disclosed in the document, favorable pellets can not necessarily be obtained from a polyester having a low melt viscosity.

Further, Patent Document 6 discloses cylindrical particles made of a polyester having an inherent viscosity of from about 0.20 to about 0.45 dL/g and their production method. The requirement of the method disclosed in the above document is that molten strands are made to pass in a narrow air gap i.e. an air gap less than about 4 inch (less than about 0.10 m) before rapidly cooled by a cooling medium to obtain cylindrical particles. However, in this method, it is difficult to stably granulate a low viscosity polyester, and particularly, it is difficult to efficiently produce polyester particles with a small particle size having a substantially cylindroid shape, suitable for solid phase polycondensation at a high speed in the present invention, from a low viscosity polyester.

As described above, no specific method of efficiently forming a polyester with a low degree of polymerization into particles has been known yet.

Patent Document 1: JP-A-51-066346
Patent Document 2: JP-A-10-512510
Patent Document 3: JP-B-55-016806
Patent Document 4: JP-B-50-024359

Patent Document 5: Japanese Patent No. 2993369
Patent Document 6: WO2004/035284

DISCLOSURE OF THE INVENTION

Objects to be Accomplished by the Invention

Under these circumstances, the object of the present invention is to provide a process for efficiently producing polyester particles with a small particle size from a polyester with a low degree of polymerization and a low melt viscosity by a strand cutting method, and polyester particles having a substantially cylindroid shape. A further object of the present invention is to provide a process for producing polyester resin particles with a high degree of polymerization, which comprises the above polyester particles having a substantially cylindroid shape to solid phase polycondensation, and polyester resin particles having a substantially cylindroid shape.

Means to Accomplish the Objects

Namely, the present invention resides in a process for producing polyester particles, characterized in that the following steps (1) to (3) are sequentially carried out, and the drawing rate ratio of polyester strands represented by the following formula is from 1.5 to 100:
(1) a step of discharging a molten polyester having a melt viscosity of from 0.5 Pa·s to 50 Pa·s from a die hole into strands,
(2) a step of bringing the obtained polyester strands into contact with a liquefied fluid for cooling to lead the strands to a cutter together with the liquefied fluid, and
(3) a step of cutting the polyester strands led to the cutter:
drawing rate ratio=(linear velocity of strands immediately before cut (v2 (m/s)))/(linear velocity of molten polyester when discharged from die hole (v1 (m/s))); and polyester particles having a substantially cylindroid shape.

The present invention further resides in a process for producing polyester resin particles, which comprises subjecting the above polyester particles having a substantially cylindroid shape to solid phase polycondensation reaction, and polyester resin particles having a substantially cylindroid shape.

EFFECTS OF THE INVENTION

According to the present invention, a polyester with a low degree of polymerization can be formed into particles stably, particularly, polyester particles with a low degree of polymerization, having a substantially cylindroid shape and having a small and uniform particle size, can efficiently be obtained. Further, by using such particles with a small particle size having a specific shape, in a solid phase polycondensation reaction, solid phase polycondensation can be conducted at a high speed, and accordingly polyester resin particles with a high degree of polymerization and excellent in processability, suitable for packaging materials for e.g. bottles, for industrial fibers, etc., can efficiently be obtained.

BEST MODE FOR CARRYING OUT THE INVENTION

Now, the present invention will be described in detail. However, the following description is a representative example, and the present invention is by no means restricted thereto.

The present invention provides a process for efficiently producing polyester particles from a polyester having a low melt viscosity by a strand cutting method, and polyester particles having a substantially cylindroid shape. Further, it relates to a process for producing polyester resin particles with a high degree of polymerization, which comprises subjecting the polyester particles having a substantially cylindroid shape to solid phase polycondensation, and polyester resin particles having a substantially cylindroid shape.

The process for producing polyester particles of the present invention (hereinafter sometimes referred to as a particles forming process) is a process for efficiently producing polyester particles having a low intrinsic viscosity, particularly polyester particles having a substantially cylindroid shape from a polyester with a low degree of polymerization having a low melt viscosity by a strand cutting method under predetermined operation conditions.

Namely, the process of the present invention is a process for producing polyester particles, characterized in that the following steps (1) to (3) are sequentially carried out, and the drawing rate ratio of polyester strands represented by the following formula is from 1.5 to 100:
(1) a step of discharging a molten polyester having a melt viscosity of from 0.5 Pa·s to 50 Pa·s from a die hole into strands,
(2) a step of bringing the obtained polyester strands into contact with a liquefied fluid for cooling to lead the strands to a cutter together with the liquefied fluid, and
(3) a step of cutting the polyester strands led to the cutter:
drawing rate ratio=(linear velocity of strands immediately before cut (v2 (m/s)))/(linear velocity of molten polyester when discharged from die hole (v1 (m/s)))

According to the particles forming process of the present invention, particles having a desired shape can efficiently be obtained from a polyester with a low degree of polymerization after the melt polycondensation reaction, having a melt viscosity at the time of discharge of from 0.5 Pa·s to 50 Pa·s. Therefore, achievement of a high degree of polymerization is not required in the melt polycondensation reaction, and an expensive equipment to carry out stirring of a liquid with a high viscosity and reaction in high vacuum in the melt polycondensation step is unnecessary. Further, according to the process of the present invention, particles with a small particle size having a substantially cylindroid shape can be obtained, and when such polyester particles with a small particle size are subjected to solid phase polycondensation, it is possible to increase the solid phase polycondensation rate. Therefore, the process is a very useful process capable of efficiently producing polyester resin particles with a high degree of polymerization.

The melt viscosity is a complex viscosity of a polyester to be formed into particles measured at a shear rate of 10 rad/s by a dynamic viscoelasticity measuring apparatus (rheometer) at a temperature of a molten polyester when discharged from a die hole.

Regarding the polyester to be used in the above step (1) in the particles forming process of the present invention, the melt viscosity of the polyester when discharged from a die hole to strands i.e. polyester strands is from 0.5 Pa·s to 50 Pa·s. The lower limit is preferably 1.5 Pa·s, more preferably 2.5 Pa·s. The upper limit is preferably 20 Pa·s, more preferably 10 Pa·s. If the melt viscosity of the polyester is less than 0.5 Pa·s, the melt viscosity is too low when the polyester is discharged from the die hole, and no stable strands will be obtained, and the strands may be broken in some cases. On the other hand, if it exceeds 50 Pa·s, since the diameter of the die hole required to obtain polyester particles with a small particle size is small, the polyester hardly passes through the die hole, thus leading to lack of operation stability. Further, to obtain a polyester having a high melt viscosity, an expensive equipment to carry out stirring of a liquid with a high viscosity and reaction in high vacuum will be required in the above-described melt polycondensation reaction, such being unfavorable.

The melt viscosity of the polyester particles obtained by the particles forming process of the present invention is equal to the melt viscosity of the strands.

In the particles forming process of the present invention, the drawing rate ratio of strands (hereinafter represented by r) is the ratio of the linear velocity (v2 (m/s)) of strands immediately before cut to the linear velocity (v1 (m/s)) of the molten polyester when discharged from the die hole, represented by the following formula:

$$r=(v2 \text{ (m/s)})/(v1 \text{ (m/s)})$$

wherein v1 (m/s)=(discharged weight (kg/s) per unit time (s: second) per one die hole/density (kg/m$^3$) of polyester)/(die hole outlet area (m$^2$)), and v2 (m/s) is the linear velocity of the strands immediately before cut by a cutter and is usually the same as the linear velocity of the strands when cut by a cutter, and accordingly it is calculated in accordance with the following formula from the number (n) of cogs of a rotary blade of the cutter, the number of revolutions (R (1/s)) and the length (L (m)) of the cut particles in the discharge direction:

$$v2 \text{ (m/s)}=RnL \text{ (m/s)}.$$

Further, in a case where a drawing roll to draw the strands is disposed before the cutter, the v2 (m/s) can be calculated in accordance with the following formula from the number of revolutions of the drawing roll as a component in the direction of the tangent line of the speed of revolution on the side of the drawing roll:

$$v2 \text{ (m/s)}=(\text{diameter (m) of drawing roll})\times(\text{number of revolutions (1/s) of drawing roll})\times(\text{pi})$$

An apparatus having a drawing roll to lead the strands stably to the cutter disposed particularly before the cutter is preferably used, and in such a case, the above method to determine v2 (m/s) from the number of revolutions of the drawing roll is simple and used preferably.

The drawing rate ratio r is adjusted so that the strands together with a liquefied fluid for cooling are led to the cutter and cut properly. As an adjustment method, for example, the flow rate of the liquefied fluid moving together with the strands is changed, and/or the speed of revolution of the drawing roll which draws the strands is changed immediately before the strands are cut by a cutter.

The lower limit of the drawing rate ratio r is 1.5, preferably 2. If it is less than 1.5, the strands discharged from the die hole will not stably move together with the liquefied fluid, the strands may wind or may be too thick and accordingly the subsequent cutting by a cutter can not smoothly be carried out, whereby the particle size will not be uniform, and irregular deformed particles having a particularly large particle size may form in some cases. The upper limit of the drawing rate ratio r is 100, preferably 50, more preferably 20. If it exceeds 100, the strands may be too thin and be difficult to be cut by a cutter, or the strands may easily be broken before they are led to the cutter in some cases.

In the particles forming process of the present invention, as a method of discharging the molten polyester into strands, the molten polyester is led to a die head through e.g. an extruder, a gear pump or a piping connected to a pressurized melt polycondensation reaction tank and discharged into strands from a single or a plurality of die holes provided at the tip of the die head. The hole shape of the die hole may, for example, be circular, elliptic, polygonal or star, or a shape of part thereof (e.g. semicircle or semiellipse) or a shape of combination thereof (e.g. a rectangular shape with semicircles on both ends). With respect to the size of the hole of the die hole, the pore diameter is preferably from 0.7 to 5.0 mm as calculated as the diameter of a circle having the same area as the area of the hole of the die hole. If it is less than 0.7 mm, the discharge pressure may be too high, whereby discharge tends to be difficult and the strands are likely to be is broken. Further, if it exceeds 5.0 mm, no appropriate drawing rate ratio r tends to be achieved, and particles with a small particle size tend to hardly be obtained.

Further, when the molten polyester is discharged from the die hole into strands, the linear velocity (v1 (m/s)) of the molten polyester discharged from the die hole is preferably from 0.1 to 3 m/s. If the linear velocity of the polyester discharged from the die hole is less than 0.1 m/s, the drawing rate ratio r tends to be high and the strands tend to be too thin, whereby they are unlikely to be cut properly by a cutter. If the linear velocity exceeds 3 m/s, the drawing rate ratio r tends to be low and the strands tend to be thick, and particles with a small particle size tend to hardly be obtained.

Further, the direction of discharge of the molten polyester when the molten polyester is discharged from the die hole into strands, is preferably within an angle formed by the horizontal direction and a direction tilted downward 70° from the horizontal direction. When the discharge direction is within this angle, the bending angle of strands at the point of contact at which the discharged polyester strands are contacted with the liquefied fluid is small, and accordingly the strands are less likely to vibrate, whereby particles can be obtained stably. The direction of discharge of the molten polyester is the slope of the tangent line of an arc is drawn by the strands very close to the die plate.

The direction of discharge is preferably within an angle formed by the horizontal direction and a direction tilted downward 60°, more preferably an angle formed by the horizontal direction and a direction tilted downward 50° from the horizontal direction.

In the particles forming process of the present invention, in the above step (2), the polyester strands obtained by discharging the molten polyester from the die hole are brought into contact with a liquefied fluid for cooling to lead the polyester strands together with the liquefied fluid to a cutter, and the liquefied fluid is not particularly limited so long as it is a liquid capable of cooling the strands discharged in a molten state and capable of traveling together with the strands. The liquefied fluid is suitably water, which is safely handled, with which a product with little foreign matters is likely to be obtained, and which is available at a low cost. The linear velocity of the liquefied fluid is preferably from about 0.5 to about 10 times, more preferably from 1 to 2 times the linear velocity v2 of the strands immediately before cut.

The temperature of the liquefied fluid to be used, e.g. water, is properly selected depending upon the temperature at the time of melting the polyester, the melting point, the softening point or the glass transition point of the polyester, or the angle of discharge or thickness of the strands, etc., but is at least 5° C., preferably at least 25° C., and at most 95° C., preferably at most 90° C. If it is less than 5° C., the strands will be cooled too rapidly, whereby vibration may occur due to shrinkage strain, or the strands may have void therein, and if it exceeds 95° C., cooling tends to be insufficient, whereby strands may fuse with one another, or particles after cut may fuse with one another, such being unfavorable. Particularly when the polyester is a polyethylene terephthalate, the lower limit of the temperature of water is preferably 10° C., more preferably 40° C., and the upper limit is preferably 70° C., more preferably 65° C.

In the particles forming process of the present invention, the polyester strands discharged from the die hole are contacted with the liquefied fluid, and when they are contacted, the rectilinear distance between the outlet of the die hole and the point of contact between the polyester strands and the liquefied fluid (when water is used as the liquefied fluid, the point will be referred to as landing point) is preferably from 10 to 500 mm. When the rectilinear distance is within this range, the equipment is easily disposed and adjusted, there will be few problems of vibration of the strands and breakage of the strands, and the polyester will stably be formed into strands, and thus particles will stably be obtained.

Particularly, in order to obtain particles with preferred shape and particle size described hereinafter, the lower limit of the rectilinear distance between the outlet of the die hole and the point of contact between the polyester strands and the liquefied fluid, is preferably 100 mm, more preferably 130 mm, particularly preferably 150 mm, and the upper limit is 500 mm. When the rectilinear distance is within this range, the molten polyester in the form of strands can be sufficiently elongated before the strands are brought into contact with the liquefied fluid, whereby fine polyester particles with an average particle size of at most 2 mm will be obtained more stably, such being particularly preferred.

The speed of travel of the liquefied fluid led to the cutter together with the polyester strands is determined by e.g. the linear velocity of the strands.

The length of the strands cooling portion (e.g. water cooling portion) by the liquefied fluid varies depending upon e.g. the temperature of the discharged polyester strands and the size of the strands, but is usually from 0.5 to 10 m. Further, in order to smoothly lead the strands and the liquefied fluid to a cutter, the cooling portion preferably inclines at an angle of from 5° to 80°, preferably from 8° to 60°, more preferably from 10° to 45°, whereby the strands will not vibrate and particles will stably be obtained.

In the above step (3) in the particles forming process of the present invention, the polyester strands led to the cutter are cut, and in this step, the polyester strands should be cooled by the liquefied fluid to such an extent that they are cuttable.

The polyester to be used for production of small particles by the particles forming process of the present invention is not particularly limited so long as it has a melt viscosity at the time of discharge of from 0.5 Pa·s to 50 Pa·s, but a polyester in a molten state obtained by subjecting a dicarboxylic acid and/or its ester forming derivative and a diol to esterification reaction and/or ester exchange reaction and further conducting melt polycondensation reaction, is preferably used as it is.

The intrinsic viscosity of the polyester to be formed into particles in the present invention is equal to the intrinsic viscosity of the polyester strands discharged from the die hole in a molten state and is preferably from 0.20 to 0.40 dL/g. The lower limit is more preferably 0.25 dL/g, and the upper limit is more preferably 0.35 dL/g, particularly preferably 0.32 dl/g. With a polyester with such a degree of polymerization that the intrinsic viscosity is less than the lower limit, the melt viscosity when discharged from the die hole is too low, whereby stable strands are unlikely to be obtained. If the intrinsic viscosity exceeds the upper limit, the polyester is difficult to pass through a die hole with a small size required to obtain polyester particles with a small particle size, and expensive equipment will be required to carry out stirring of a liquid with a high viscosity and reaction in high vacuum in the above-described melt polycondensation reaction step, such being unfavorable.

The polyester to be used for the particles forming process of the present invention is suitably produced by subjecting a dicarboxylic acid and/or its ester forming derivative and a diol to esterification reaction and/or ester exchange reaction and then to melt polycondensation reaction using a polycondensation catalyst, but the method is not particularly limited, and basically a known method for producing a polyester can be employed. For example, such a method may be mentioned that a dicarboxylic acid component such as terephthalic acid and a diol component such as ethylene glycol or butylene glycol are put in a slurry preparation tank and stirred and mixed to prepare a raw material slurry, which is subjected to esterification reaction in an esterification reaction tank under normal pressure to elevated pressure with heating while distilling water or the like caused by the reaction off, and a polyester low polymer (oligomer) as the obtained esterification reaction product is transferred to a polycondensation reaction tank and subjected to melt polycondensation reaction using a polycondensation catalyst under reduced pressure with heating to obtain a polyester.

In a case where the dicarboxylic acid component is one having a melting point close to the polycondensation reaction temperature, e.g. an ester forming derivative of a dicarboxylic acid such as dimethyl terephthalate, it may not be formed into a slurry with the diol but may be melted and then subjected to ester exchange reaction with a diol.

A method of carrying out the above reaction may be any of a continuous method, a batch method and a semibatch method, or a combination thereof. Further, each of the esterification reaction tank (or an ester exchange reaction tank) and the melt polycondensation reaction tank may be single stage or multistage.

The polyester particles obtained by the particles forming process of the present invention are suitably used in a process of crystallizing them after granulation and further conducting solid phase polycondensation. Thus, the particles forming process of the present invention is suitably applied to a process for producing a polyester resin such as a polyethylene terephthalate resin and/or a polybutylene terephthalate resin by carrying out such solid phase polycondensation, that is, a process for producing a polyester resin wherein the main component of the dicarboxylic acid among the polyester raw materials is terephthalic acid and/or dimethyl terephthalate, and the main component of the diol is ethylene glycol and/or 1,4-butanediol. Here, the "main component" means that terephthalic acid accounts for 85 mol % or more of all dicarboxylic acid components and that ethylene glycol or 1,4-butanediol accounts for 85 mol % or more of all diol components.

In a method for producing the polyester to be used in the present invention, for the melt polycondensation reaction, usually a polycondensation catalyst is used. The polycondensation catalyst to be used is not particularly limited, and usually a known catalyst as a polycondensation catalyst for production of a polyester resin can be used. For example, a germanium compound, an antimony compound, a titanium compound, a manganese compound, a zinc compound, an aluminum compound, a tungsten compound or the like may be used, and among them, preferred is at least one metal compound selected from a germanium compound, an antimony compound and a titanium compound.

The molten polyester in the particles forming process of the present invention may be one obtained by once solidifying and then remelting the polyester obtained by the above melt polycondensation reaction before used as a material for the particles forming process of the present invention, or may be the polyester in a molten state obtained by the melt polycondensation reaction as it is. The method of solidifying the polyester obtained by the melt polycondensation reaction is unfavorable since it requires an operation of pelletizing the polyester at the solidifying step or an energy for remelting, and it is preferred to obtain a polyester in a molten state by the melt polycondensation reaction and using the obtained polyester as a material to be subjected to the particles forming process of the present invention as it is.

The polyester obtained by the melt polycondensation reaction is preferably supplied to a die head connected to the melt polycondensation reaction tank via a piping and discharged from a plurality of die holes provided at the tip of the die. The discharged polyester strands are formed into particles by the process of the present invention. As the case requires, a gear pump or a filter may be provided in the piping between the melt polycondensation reaction tank and the die head.

Of the polyester particles obtainable by the particles forming process of the present invention, the average particle size is preferably at least 0.5 mm, more preferably at least 0.6 mm, particularly preferably at least 0.65 mm, and preferably at most 2.0 mm, more preferably at most 1.8 mm, particularly preferably at most 1.6 mm. Particles obtained by the production process of the present invention and having an average particle size within the above range are more preferred, since the solid phase polycondensation rate when the polyester particles are subjected to solid phase polycondensation is high. The size of the particles is more preferably the lower limit or above, whereby troubles are less likely to occur in the subsequent steps or during air power transport. Further, the size of the particles is more preferably the upper limit or smaller, whereby troubles such as breakage or formation of dust will hardly occur at the time of granulation, and the time for the solid phase polycondensation reaction required to achieve a desired molecular weight can be shortened.

The average particle size of the particles is a value at the cumulative percentage of 50% in a cumulative distribution curve prepared by the dry sieving method as stipulated in JIS K0069.

The polyester particles obtained by the particles forming process of the present invention preferably have a substantially cylindroid shape. The "substantially cylindroid shape" includes a cylindroid, quadrangular prism and an intermediate thereof. The "cylindroid" is a prism having an elliptic cut surface, and the "quadrangular prism" is a prism having a rectangular cut surface. Further, the "intermediate thereof" is a prism having a cut surface of a shape inscribed in a rectangular having a long side and a short side equal to the major axis and the short axis of the cut surface, e.g. a shape inscribed in a rectangular lacking at least part of four corners in the arc shape, and in the present invention, it is expressed as a "a cylindroid substantially close to a quadrangular prism" or a "a cylindroid close to a shape having semicircles imparted to both ends of a quadrangular prism" or the like. The polyester particles of the present invention having the above shape are preferred in that the specific surface area (surface area/volume) of the particles is large, whereby the solid phase polycondensation rate is relatively high.

A preferred shape of the polyester particles obtainable by the particles forming process of the present invention is a substantial cylindroid having the size described below. That is, the length is at least 0.5 mm and at most 2.5 mm, more preferably at most 2 mm, particularly preferably at most 1.5 mm. Further, the cut surface has a major axis of at least 0.5 mm and at most 2.5 mm, more preferably at most 2 mm, particularly preferably at most 1.5 mm, and a short axis of at least 0.3 mm and at most 2 mm, more preferably at most 1.5 mm, particularly preferably at most 1.2 mm.

Preferred polyester particles are ones having an intrinsic viscosity of from 0.20 to 0.40 dL/g, a length of from 0.5 to 2.5 mm, having a cut surface with a major axis and a short axis of from 0.5 to 2.5 mm and from 0.3 to 2 mm, respectively, and having a substantially cylindroid shape.

Particularly preferred polyester particles are ones having a length of from 0.5 to 1.5 mm, having a cut surface with a major axis and a short axis of from 0.5 to 1.5 mm and from 0.3 to 1.2 mm, respectively, and having a substantially cylindroid shape. Such a shape is advantageous in production of a polyester resin, since the specific surface area of the particles tends to be large, whereby the solid phase polycondensation rate is relatively high as compared with cylindrical particles as disclosed in Patent Document 6.

The polyester particles obtained by the particles forming process of the present invention are preferably further subjected to solid phase polycondensation, and particularly when polyester resin particles having crystallinity are desired, the polyester particles are subjected to a solid phase polycondensation step thereby to produce polyester resin particles with a higher degree of polymerization. Polyester resin particles thus produced are polyester resin particles having more favorable physical properties in view of moldability, mechanical and physical properties of a molded product to be obtained, etc.

The polyester particles of the present invention, for example, the polyester particles obtained by the above particles forming process, are subjected to a solid phase polycondensation step to produce polyester resin particles, and a specific method of the solid phase polycondensation is not particularly limited, and various methods may be employed according to need. As a known method, a method may be mentioned wherein the polyester particles are fluidized in an inert gas stream at from 120 to 180° C. for from 0.5 to 12 hours to carry out crystallization and drying treatment, and then solid phase polycondensation is continuously carried out in a moving bed while flowing an inert gas usually at a temperature of 180° C. or above and a temperature lower by 5° C. than the melting point of the polyester. The solid phase polycondensation time is set depending on the intrinsic viscosity of the aimed polyester resin and is usually from about 1 to about 50 hours. With respect to the intrinsic viscosity after the solid phase polycondensation, the lower limit is usually 0.70 dL/g, preferably 0.72 dL/g, more preferably 0.74 dL/g, and the upper limit is usually 1.50 dL/g, preferably 1.45 dL/g, more preferably 1.40 dL/g. When the intrinsic viscosity of the polyester resin particles obtained by the production process of the present invention is within this range, a molded product obtained from such polyester resin particles is excellent in mechanical strength and melt moldability, such being more favorable.

Particularly, in production of a polyester resin by the solid phase polycondensation in the present invention, it is preferred to subject polyester particles having particularly preferred size and shape obtained by the above-described particles-forming process of the present invention to solid phase polycondensation. In such a case, slight shrinkage or the like by crystallization will occur, but the polyester resin after the solid phase polycondensation is a polyester resin having an intrinsic viscosity of at least 0.70 dL/g, in the form of the most preferred particles having a substantially cylindroid shape having a length of from 0.5 mm to 1.5 mm and a cut surface with a major axis and a minor axis of from 0.5 mm to 1.5 mm and from 0.3 mm to 1.2 mm, respectively. The polyester resin having such size and shape of the present invention is more preferred in that solid phase polycondensation for production thereof is carried out in a short time and the melting time when the polyester resin of the present invention is subjected to thermoforming is short.

The polyester resin particles to be produced by the solid phase polycondensation method of the present invention are excellent in mechanical strength and melt moldability, and are suitably used for bottles to be filled with a beverage, by molding a preform by injection molding or extrusion, followed by orientation blow molding. Further, the polyester resin particles can be formed into a bottle also by direct blow molding.

Further, the polyester resin particles can be suitably used for various applications such as a packaging material by forming them into a film or a sheet by injection molding or orientation molding, and can be suitably used as fibers by extrusion/orientation molding.

EXAMPLES

Now, the present invention will be described in further detail with reference to Examples, but the present invention is by no means restricted to the following Examples.

Methods of evaluating physical properties in the present invention are as follows.

(Intrinsic Viscosity)

About 0.25 g of a sample (polymer) was dissolved in about 25 mL of a solvent mixer of phenol/1,1,2,2-tetrachloroethane (weight ratio 1/1) at 140° C. so that the concentration became $1.00 \times 10^{-2}$ kg/L. Then, the solution was cooled to 30° C., and the number of seconds during falling of the sample solution at a concentration of $1.00 \times 10^{-2}$ kg/L and the solvent alone was measured by an automatic solution viscometer ("2CH model DJ504" manufactured by SENTEC Corporation) to calculate the intrinsic viscosity in accordance with the following formula:

$$[\eta]=[(1+4K_H\eta_{SP})^{0.5}-1]/(200K_HC)$$

wherein $\eta_{SP}=\eta/\eta_0-1$, $\eta$ is the number of seconds during falling of the sample solution, $\eta_0$ is the number of seconds during falling of the solvent, C is the polymer solution concentration (kg/L), and $K_H$ is the Huggins constant, provided that $K_H=0.33$ was employed.

(Melt Viscosity)

A sample was vacuum dried at 120° C. for 14 hours, and a test piece with a diameter of 25 mm and a thickness of 2 mm was prepared at a temperature of 280° C. by using a pressing machine ("MINI PRESS" manufactured by Toyo Seiki Seisaku-sho Ltd.). The sample was stored in a desiccator immediately before measurement.

As a measuring apparatus, a dynamic viscoelasticity measuring apparatus ("ARES100 model" manufactured by TA Instruments) was used, and the detector was a full scale 10 g type. As a measuring jig, parallel plates with a diameter of 25 mm were used, and the plate distance was 1.5 mm. The measuring operation was as follows.

A heating oven was heated to the measurement temperature, the sample was inserted between parallel plates and the heating oven was closed, and upon confirmation of the sample being melted, the upper plate was let down and closely contacted to the sample, and the sample was pressed to a plate distance of 1.5 mm.

Then, the heating oven was opened, the sample spilled from the plates was removed and the heating oven was closed again, the plate distance was set at 1.50 mm, and upon confirmation of the temperature being stabilized at the measurement temperature, measurement was started. The strain at the time of measurement was 30%. Further, the time from insertion of the sample to the beginning of measurement was set to 8 minutes.

In such a manner, the complex viscosity at a temperature of the molten polyester when discharged from a die hole at a shear rate of 10 rad/s was measured and regarded as the melt viscosity.

(Average Particle Size)

Measured in accordance with a dry sieving test method as stipulated in JIS K0069.

A polyester to be subjected to production of polyester particles in Examples 1 to 6 and Comparative Example 1 was produced as follows.

(Production of Polyester)

A polyester with a low degree of polymerization to be subjected to strand cutting was produced by using a polyester continuous production apparatus equipped with a slurry preparation tank having a stirrer, an ethylene glycol charge piping and a terephthalic acid charge piping; a piping which transfers a slurry to a first esterification tank; complete mixing type first and second esterification reaction tanks having a stirrer, a separation column, a material receiver, a catalyst charge piping and a reaction product transfer piping; a piping which transfers an esterification reaction product (oligomer) to a melt polycondensation reaction tank; a complete mixing type first melt polycondensation reaction tank having a stirrer, a separation column, an oligomer receiver and a catalyst charge piping; plug flow type second and third melt polycondensation reaction tanks having a stirrer, a separation column and a polymer receiver; and a polyester discharge piping. A specific method was as follows.

(Polyester A: Material A)

In the slurry preparation tank, a terephthalic acid/ethylene glycol (molar ratio 1:1.5) slurry having orthophosphoric acid added thereto so that the phosphorus concentration in a polyester to be obtained became 22 wtppm as phosphorous atoms, was prepared. Further, 400 parts by weight of bis-(beta-hydroxyethyl)terephthalate was charged in the first esterification tank and melted in a nitrogen atmosphere, and in the first tank maintained at a temperature of 262° C. under a pressure of 96 kPaG (hereinafter G represents the relative pressure to the atmospheric pressure), the above slurry prepared in the slurry preparation tank was continuously charged at a rate of 135 parts by weight/hour so that the average retention time as the polyester became 4.5 hours, to carry out esterification reaction while distilling formed water off from the separation column, and the reaction liquid was continuously transferred to the second esterification reaction tank.

In the second esterification reaction tank, esterification reaction was carried out by continuously adding an ethylene glycol solution of antimony trioxide (concentration: 1.8 wt % as the antimony atom concentration) so that the antimony concentration in a polyester to be obtained became 183 wtppm as antimony atoms, at a temperature of 260° C. under a pressure of 5 kPaG for a retention time of 1.5 hours, and the product was continuously transferred to the complete mixing type first melt polycondensation reaction tank through the transfer piping. In the first melt polycondensation reaction tank, reaction was carried out under a pressure of 2.5 kPaA (hereinafter A represents the absolute pressure) of the polycondensation reaction tank at a temperature of 273° C. for a retention time of 1.0 hour, and the obtained polyester was taken through the discharge piping in the middle of the transfer piping to the second melt polycondensation reaction tank and cooled and solidified.

The intrinsic viscosity of the obtained polyester was 0.215 dL/g.

The cooled and solidified polyester was made to pass through two stainless steel rolls having axes of rotation in parallel with each other, disposed to be close to each other, having irregularities on the surface and rotating in different directions four times to compress and pulverize the polyester to obtain irregular polyester particles having a particle size within a range of from 0.1 mm to 3.36 mm. The irregular polyester particles will be referred to as "material A".

(Polyester B: Material B)

The reaction up to the first melt polycondensation reaction tank was carried out in the same manner as in the above method for producing the material A, and the obtained polyester was transferred to the second melt polycondensation reaction tank. In the second melt polycondensation reaction tank, melt polycondensation reaction was carried out under a pressure of 2.0 kPaA at a temperature of 280° C. for a retention time of 1.0 hours, and the obtained polyester was transferred to the third melt polycondensation reaction tank through the transfer piping. In the third melt polycondensation reaction tank, melt polycondensation reaction was carried out under a pressure of 1.5 kPaA at a temperature of 280° C. for a retention time of 1.2 hours. The obtained polyester was drawn and led to a die head through the discharge piping and taken out from the die hole in the form of strands, which were cooled with water and solidified and then cut by a cutter to obtain polyester particles having an intrinsic viscosity of 0.403 dL/g and an average particle size of 3 mm. The polyester particles will be referred to as "material B".

(Formation of Polyester into Particles)

The material A and the material B obtained by the above methods were put in an inert oven through which nitrogen flowed, dried at a temperature of 180° C. for 3 hours and mixed in a predetermined ratio as identified in Table 1, and the mixture was supplied to a twin screw extruder of 45 mm in diameter and discharged from a die plate at a resin temperature of 280° C. into strands. The polyester strands were formed into particles by a strand cutting method using a pelletizer (P-USG200) manufactured by Rieter Automatik GmbH. That is, the polyester strands were transferred to a cutter while bringing it into contact with water at a predetermined temperature and cooling it together with water, and on that occasion, the polyester strands were sandwiched between a pair of drawing rolls disposed before the cutter and drawn and then supplied to the cutter and cut by cutter having a fixed blade and a rotary blade to obtain polyester particles. The length of the water cooling portion was 2 mm, the slant at the water cooling portion was 20° to the horizontal direction, and the rotary blade was one having 60 cogs.

Operation conditions such as the linear velocity of the strands being discharged and the drawing rate ratio in each Example are shown in Table 1.

Example 1

Material A was continuously supplied to an extruder at a rate of 48 kg/hour and melted, and discharged from a die plate with 6 circular die holes of 2 mm in diameter at a resin temperature of 280° C. into strands. The direction of discharge was at an angle of 45° downward from the horizontal direction. The linear velocity of the polyester being discharged is 0.58 m/sec calculated assuming that the density of the polyester at a resin temperature of 280° C. was 1.23 kg/L.

The polyester strands were landed on a cooling zone of a strand cutter in such a state that the rectilinear distance between the outlet of the die hole and the point of contact between the polyester strands and water (landing point) (hereinafter the linear distance will be referred to as an "air cooling distance") became 140 mm, and transferred while being cooled with water at 50° C., drawn by drawing rolls and supplied to a cutter. The strand drawing rate was 2.33 m/sec, and the drawing rate ratio was 4.0. Formation into particles was carried out by adjusting the ratio of the number of revolutions of the drawing rolls to the rotary blade of the cutter so that the length of the particles in the drawing direction became 1.5 mm.

As a result, polyester particles having a cylindroid shape substantially close to a quadrangular prism, having a length of 1.5 mm and a cut surface with a major axis and a minor axis of 1.5 mm and 0.7 mm, respectively, were obtained. The average particle size of the particles was 1.5 mm. The amount of irregular particles which did not pass through a sieve with an opening of 2.8 mm, formed in the particles forming step, was 3 wt %. Further, the melt viscosity of the particles at 280° C. was 1.7 Pa·s, and the intrinsic viscosity was 0.205 dL/g. The operation conditions and the results are shown in Table 1.

Example 2

Formation of the polyester into particles was carried out in the same manner as in Example 1 except that the operation conditions were changed as identified in Table 1. As a result, polyester particles having a cylindroid shape substantially close to a quadrangular prism, having a length of 1.5 mm and a cut surface with a major axis and a minor axis of 1.5 mm and 0.8 mm, respectively, were obtained. The average particle size of the particles was 1.5 mm. The amount of irregular particles which did not pass through a sieve with an opening of 2.8 mm, formed in the particles forming step, was 3 wt %. The operation conditions and the results are shown in Table 1.

Example 3

Formation of the polyester into particles was carried out in the same manner as in Example 1 except that the operation conditions were changed as identified in Table 1. As a result, polyester particles having a cylindroid shape substantially close to a quadrangular prism, having a length of 1.5 mm and a cut surface with a major axis and a minor axis of 1.4 mm and 0.7 mm, respectively, were obtained. The average particle size of the particles was 1.5 mm. The amount of irregular particles which did not pass through a sieve with an opening of 2.8 mm, formed in the particles forming step, was 2 wt %. The operation conditions and the results are shown in Table 1.

Example 4

Formation of the polyester into particles was carried out in the same manner as in Example 1 except that the operation conditions were changed as identified in Table 1. As a result, polyester particles having a cylindroid shape substantially close to a quadrangular prism, having a length of 1.5 mm and a cut surface with a major axis and a minor axis of 1.4 mm and 0.9 mm, respectively, were obtained. The average particle size of the particles was 1.5 mm. The amount of irregular particles which did not pass through a sieve with an opening of 2.8 mm, formed in the particles forming step, was 2 wt %. The operation conditions and the results are shown in Table 1.

Example 5

Formation into particles was carried out in the same manner as in Example 1 except that the die plate was changed to a die plate with 2 circular die holes of 3 mm in diameter, that the cooling water temperature was 61° C., that the number of revolutions of the rotary blade of the cutter was adjusted so that the length of the particles in the drawing direction became 1.25 mm, and that the operation conditions were as identified in Table 1. As a result, polyester particle having a cylindroid shape substantially close to a quadrangular prism, having a length of 1.25 mm and a cut surface with a major axis and a minor axis of 1.2 mm and 0.8 mm, respectively, were obtained. The average particle size of the particles was 1.2 mm. The amount of irregular particles which did not pass through a sieve with an opening of 2.8 mm, formed in the particles forming step, was 1 wt %. The operation conditions and the results are shown in Table 1.

Comparative Example 1

Formation of the polyester into particles was attempted in the same manner as in Example 1 except that the operation conditions were changed as identified in Table 1. As a result, the strands wound, a large amount of irregular particles and uncut strands formed, and stable granulation could not be carried out. The operation conditions and the results are shown in Table 1.

Example 6

The polyester particles obtained in Example 5 were put in an inert oven through which nitrogen flowed, crystallized at a temperature of 180° C. for 2 hours and then subjected to solid phase polycondensation at 230° C. for 12 hours to obtain polyester particles having a high molecular weight. The particles had a cylindroid shape substantially close to a quadrangular prism having a length of 1.2 mm and a cut surface with a major axis and a minor axis of 1.2 mm and 0.8 mm, respectively, and had an intrinsic viscosity of 0.845 dL/g.

ously charged at a rate of 135 parts by weight/hour so that the average retention time as a polyester became 4.5 hours to carry out esterification reaction while distilling formed water off from the separation column, and the reaction liquid was continuously transferred to the second esterification reaction tank.

In the second esterification reaction tank, esterification reaction was carried out at a temperature of 260° C. under a pressure of 5 kPaG for a retention time of 1.5 hours, and the reaction product was continuously transferred to the complete mixing type first melt polycondensation reaction tank through the transfer piping.

In the first melt polycondensation reaction tank, reaction was carried out at a temperature of 270° C. under a pressure of 4.0 kPaA for a retention time of 1.0 hour, and the reaction product was continuously transferred to the second melt polycondensation reaction tank through the transfer piping. In the second melt polycondensation reaction tank, melt polycondensation reaction was carried out at a temperature of 270° C. under a pressure of 4.0 kPaA for a retention time of 1.0 hour, and the reaction product was transferred to the third melt polycondensation reaction tank through the transfer piping. In the third melt polycondensation reaction tank, melt polycondensation reaction was carried out at a temperature of 270° C. under a pressure of 4.0 kPaA for a retention time of 1.2 hours.

TABLE 1

| | | | Ex. 1 | Ex. 2 | Ex. 3 | Ex. 4 | Ex. 5 | Comp. Ex. 1 |
|---|---|---|---|---|---|---|---|---|
| Operation conditions | Blended materials (A/B) | (wt/wt) | 10/0 | 10/0 | 10/0 | 8/2 | 6/4 | 10/0 |
| | Resin temperature | ° C. | 280 | 280 | 280 | 280 | 280 | 280 |
| | Discharge linear velocity (v1) | m/s | 0.58 | 0.72 | 0.72 | 0.72 | 0.42 | 0.58 |
| | Strand linear velocity (v2) | m/s | 2.33 | 2.33 | 3.00 | 2.50 | 3.00 | 0.80 |
| | Drawing rate ratio (r = v2/v1) | | 4.0 | 3.2 | 4.2 | 3.5 | 7.1 | 1.4 |
| | Air cooling distance | mm | 140 | 150 | 150 | 150 | 130 | 120 |
| Physical properties of particles | Melt viscosity | Pa · s | 1.7 | 1.7 | 1.8 | 2.6 | 3.1 | 1.7 |
| | Intrinsic viscosity | dl/g | 0.205 | 0.203 | 0.203 | 0.225 | 0.262 | 0.204 |
| | Average particle size | mm | 1.5 | 1.5 | 1.5 | 1.5 | 1.2 | Granulation impossible |
| | Coarse particles (2.8 mm or larger) | wt % | 3 | 3 | 2 | 2 | 1 | Granulation impossible |

Example 7

Using the polyester continuous production apparatus used in the above (Production of polyester), esterification reaction of a dicarboxylic acid and a diol was carried out and further melt polycondensation reaction was carried out to obtain a polyester in a molten state, and the obtained polyester in a molten state was used for production of particles as it was to produce polyester particles with a low degree of polymerization. A specific method was as follows.

In the slurry preparation tank, a terephthalic acid/ethylene glycol (molar ratio 1:1.5) slurry containing tetra-n-butyl titanate in an amount of 8 wtppm as titanium based on a polyester to be obtained, was prepared. Further, 400 parts by weight of bis-(beta-hydroxyethyl)terephthalate was charged to the first esterification tank and melted in a nitrogen atmosphere, and to the first esterification tank maintained at a temperature of 262° C. under a pressure of 96 kPaG, the above slurry prepared in the slurry preparation tank was continu- The molten polyester thus obtained was led to the die head through the gear pump and the discharge piping as it was, discharged from the die hole into strands, which are cooled with water and formed into particles by a pelletizer (P-USG100) manufactured by Rieter Automatik GmbH. The particles forming process was a strand cutting method, and specifically, the polyester strands were transferred to the cutter direction together with water while bringing the polyester strands into contact with water and cooling them, sandwiched between a pair of drawing rolls disposed before the cutter and drawn and supplied to the cutter, and cut by the cutter having a fixed blade and a rotary blade to obtain polyester particles. The water cooling length was 2 mm, the slant at the water cooling portion was 200 to the horizontal plane, and the rotary blade was one having 60 cogs.

The amount of discharge of the molten polyester was 126 kg/hour, the temperature was set at 270° C., and the polyester was discharged from a die plate having 4 circular die holes of 3 mm in the direction of discharge at an angle of 45° downward from the horizontal direction, into strands. The linear velocity of the polyester being discharged is 1.01 m/sec calculated assuming that the density of the polyester at a resin temperature of 270° C. was 1.23 kg/L.

The polyester strands were landed on a cooling zone (water cooling portion) of the strand cutter in a state where the air cooling distance became 170 mm, transferred while cooling with water at 50° C., drawn by drawing rolls and supplied to the cutter. The strands drawing rate was 3.00 m/sec, and the drawing rate ratio was 3.0. Formation into particles was carried out by adjusting the ratio of the number of revolutions of the drawing rolls to the rotary blade of the cutter so that the length of the particles in the drawing direction became 1.0 mm.

As a result, polyester particles having a cylindroid shape substantially close to a shape having semicircles imparted to both ends of a quadrangular prism, having a length of 1.0 mm and a cut surface with a major axis and a minor axis of 1.9 mm and 1.3 mm, respectively, were obtained. The average particle size of the particles was 1.8 mm. The amount of irregular particles which did not pass through a sieve with an opening of 2.8 mm formed in the particles forming step was 0.02 wt %. Further, the melt viscosity of the particles at 270° C. was 9.1 Pa·s, and the intrinsic viscosity was 0.290 dL/g. The operation conditions and the results are shown in Table 2.

Example 8

Formation of the polyester into particles was carried out in the same manner as in Example 7 except that the operation conditions were changed as identified in Table 2 by changing the amount of discharge of the molten polyester to 98 kg/hour. As a result, polyester particles having a cylindroid shape substantially close to a shape having semicircles imparted to both ends of a quadrangular prism, having a length of 1.0 mm and a cut surface with a major axis and a minor axis of 1.6 mm and 1.2 mm, respectively, were obtained. The average particle size of the particles was 1.5 mm. The amount of irregular particles which did not pass through a sieve with an opening of 2.8 mm, formed in the particles forming step, was 0.01 wt %. The operation conditions and the results are shown in Table 2.

Example 9

Formation of the polyester into particles was carried out in the same manner as in Example 7 except that the operation conditions were changed as identified in Table 2 by changing the amount of discharge of the molten polyester to 61 kg/hour. As a result, polyester particles having a cylindroid shape substantially close to a shape having semicircles imparted to both ends of a quadrangular prism, having a length of 1.0 mm and a cut surface with a major axis and a minor axis of 1.3 mm and 0.9 mm, respectively, were obtained. The average particle size of the particles was 1.3 mm. The amount of irregular particles which did not pass through a sieve with an opening of 2.8 mm, formed in the particles forming step, was 0.01 wt %. The operation conditions and the results are shown in Table 2.

Example 10

Formation of the polyester into particles was carried out in the same manner as in Example 7 except that the operation conditions were changed as identified in Table 2. As a result, polyester particles having a cylindroid shape substantially close to a shape having semicircles imparted to both ends of a quadrangular prism, having a length of 1.0 mm and a cut surface with a major axis and a minor axis of 2.5 mm and 1.8 mm, respectively, were obtained. The average particle size of the particles was 2.2 mm. The amount of irregular particles which did not pass through a sieve with an opening of 2.8 mm, formed in the particles forming step, was 0.03 wt %. The operation conditions and the results are shown in Table 2.

Comparative Example 2

Formation of the polyester into particles was attempted in the same manner as in Example 7 except that the operation conditions were changed as identified in Table 2. As a result, since strands wound, in addition to polyester particles having a cylindroid shape substantially close to a shape having semicircles imparted to both ends of a quadrangular prism, having a length of 1.0 mm and a cut surface with a major axis and a minor axis of 3.1 mm and 1.9 mm, particles cut at a slant and irregular particles with a length of 10 mm or longer were obtained. The amount of irregular particles which did not pass through a sieve with an opening of 2.8 mm was 4 wt %. The operation conditions and the results are shown in Table 2.

Comparative Example 3

Formation of the polyester into particles was attempted in the same manner as in Example 7 except that the direction of discharge of the molten polyester was changed to an angle (vertical downward) of 90° downward from the horizontal direction, that the air cooling distance of the polyester strands was changed to 58 mm, that the temperature of the cooling water was changed to 20° C., that the strands drawing rate was changed to 1.00 m/sec to change the drawing rate ratio to 1.0, that the length of the particles in the drawing direction was changed to 3.0 mm, and that the operation conditions were changed as identified in Table 2. As a result, since strands wound, in addition to cylindrical polyester particles having a length of 3.0 mm and a cut surface with a diameter of 3.0 mm, crushed particles, particles cut at a slant, and irregular particles having a length of 10 mm or longer were obtained. The amount of such irregular particles formed was 10 wt %. Further, most of the obtained particles had bubbles in their inside, probably because the cooling water temperature was low and the strands were thick. The operation conditions and the results are shown in Table 2.

Example 11

Formation of the polyester into particles was carried out in the same manner as in Example 7 except that the temperature of the second and third melt polycondensation reaction tanks was changed to 275° C. so that the temperature of the molten polyester at the time of discharge became 275° C., that the die plate was changed to one having 10 die holes, that the amount of the molten polyester discharged was changed to 78 kg/hour, and that the operation conditions were changed as identified in Table 2. As a result, polyester particles having a cylindroid shape substantially close to a shape having semicircles imparted to both ends of a rectangular prism, having a length of 1.0 mm and a cut surface with a major axis and a minor axis of 1.0 mm and 0.7 mm, respectively, were obtained. The average particle size of the particles was 1.0 mm. The amount of irregular particles which did not pass through a sieve with an opening of 2.8 mm, formed in the particles forming step, was 0.03 wt %. The operation conditions and the results are shown in Table 2.

Example 12

The polyester particles obtained in Example 9 were charged to an inert oven through which nitrogen flowed, crystallized at a temperature of 180° C. for 2 hours and subsequently subjected to solid phase polycondensation at 230° C. for 12 hours to obtain polyester particles having a high molecular weight. The particles had a cylindroid shape substantially close to a shape having semicircles imparted to both ends of a quadrangular prism, having a length of 0.9 mm and a cut surface with a major axis and a minor axis of 1.3 mm and 0.9 mm, respectively, and had an intrinsic viscosity of 0.866 dL/g.

Comparative Example 4

Among polyester particles obtained in Comparative Example 3, particles having a relatively good shape were selected and charged to an inert oven through which nitrogen flowed and crystallized at a temperature of 180° C. for 2 hours. As a result, most of the particles burst by the influence of the bubbles in their inside and became irregular particles. The particles obtained in Comparative Example 3 were particles unsuitable for solid phase polycondensation.

TABLE 2

| | | | Ex. 7 | Ex. 8 | Ex. 9 | Ex. 10 | Comp. Ex. 2 | Comp. Ex. 3 | Ex. 11 |
|---|---|---|---|---|---|---|---|---|---|
| Operation conditions | Resin temperature | ° C. | 270 | 270 | 270 | 270 | 270 | 270 | 275 |
| | Discharge linear velocity (v1) | m/s | 1.01 | 0.78 | 0.49 | 1.01 | 1.01 | 1.01 | 0.72 |
| | Strand linear velocity (v2) | m/s | 3.00 | 3.00 | 3.00 | 1.58 | 1.17 | 1.00 | 2.50 |
| | Drawing rate ratio (r = v2/v1) | | 3.0 | 3.8 | 6.2 | 1.6 | 1.2 | 1.0 | 10.0 |
| | Air cooling distance | mm | 170 | 160 | 155 | 170 | 165 | 58 | 150 |
| Physical properties of particles | Melt viscosity | Pa·s | 9.1 | 9.1 | 9.1 | 9.1 | 9.1 | 9.1 | 15.0 |
| | Intrinsic viscosity | dl/g | 0.290 | 0.290 | 0.290 | 0.290 | 0.290 | 0.290 | 0.320 |
| | Average particle size | mm | 1.8 | 1.5 | 1.3 | 1.8 | Measurement impossible | Measurement impossible | 1.0 |
| | Coarse particles (2.8 mm or larger) | wt % | 0.02 | 0.01 | 0.01 | 0.03 | 4 | 10 | 0.03 |

INDUSTRIAL APPLICABILITY

The polyester particles obtained by the present invention are suitable for solid phase polycondensation at a high rate and are useful as a material of polyester resin particles. Further, the polyester resin particles obtained by the present invention are excellent in mechanical properties, thermal properties, electrical properties, etc. and are widely used for fibers and for molded products such as films, sheets and bottles for various applications.

The entire disclosure of Japanese Patent Application No. 2005-128890 filed on Apr. 27, 2005 including specification, claims, drawings and summary is incorporated herein by reference in its entirety.

The invention claimed is:

1. A process for producing polyester particles, comprising:
   (1) discharging a molten polyester having a melt viscosity of from 0.5 Pa·s to 50 Pa·s from a die hole thereby creating polyester strands;
   (2) bringing the polyester strands into contact with a liquefied fluid for cooling to lead the strands to a cutter together with the liquefied fluid; and
   (3) cutting the polyester strands led to the cutter;
   wherein steps (1) to (3) are carried out sequentially and the drawing rate ratio of the polyester strands is from 1.5 to 100 and represented by the formula:

drawing rate ratio=(linear velocity of strands immediately before cut (v2 (m/s)))/(linear velocity of molten polyester when discharged from die hole (v1 (m/s))); and wherein the pore diameter of the die hole through which the molten polyester is discharged into polyester strands is from 0.7 to 3.0 mm.

2. The process for producing polyester particles according to claim 1, wherein the liquefied fluid is water at a temperature of from 5 to 95° C.

3. The process for producing polyester particles according to claim 1, wherein the linear velocity (v1 (m/s)) of the molten polyester when the molten polyester is discharged from the die hole into strands is from 0.1 to 3 m/sec.

4. The process for producing polyester particles according to claim 1, wherein the direction of discharge of the molten polyester when the molten polyester is discharged from the die hole into strands, is within an angle formed by the horizontal direction and a direction tilted downward 70° from the horizontal direction.

5. The process for producing polyester particles according to claim 1, wherein when the polyester strands discharged from the die hole are brought into contact with the liquefied fluid, the rectilinear distance between the outlet of the die hole and the point of contact between the polyester strands and the liquefied fluid is from 10 to 500 mm.

6. The process for producing polyester particles according to claim 1, wherein the average particle size of the polyester particles is from 0.5 to 2.0 mm.

7. The process for producing polyester particles according to claim 1, wherein the polyester particles have a substantially cylindroid shape.

8. The process for producing polyester particles according to claim 7, wherein the polyester particles have a substantially cylindroid shape having a length of from 0.5 to 2.5 mm and a cut surface with a major axis and a minor axis of from 0.5 to 2.5 mm and from 0.3 to 2 mm, respectively.

9. The process for producing polyester particles according to claim 1, wherein as the molten polyester, a polyester in a molten state obtained by subjecting a dicarboxylic acid and/or its ester-forming derivative and a diol to esterification reaction and/or ester exchange reaction and further conducting melt polycondensation reaction, is used as it is.

10. The process for producing polyester particles according to claim 1, wherein the intrinsic viscosity of the polyester to be subjected to the step (1) is from 0.20 to 0.40 dL/g.

11. The process for producing polyester particles according to claim 1, wherein the polyester is a polyethylene terephthalate and/or a polybutylene terephthalate.

12. Polyester particles, which have a substantially cylindroid shape, obtained by the production process as defined in claim 1.

13. The polyester particles according to claim 12, which have a substantially cylindroid shape having a length of from 0.5 to 2.5 mm and a cut surface with a major axis and a minor axis of from 0.5 to 2.5 mm and from 0.3 to 2 mm, respectively.

14. A process for producing polyester resin particles, which comprises subjecting the polyester particles as defined in claim 12 to solid phase polycondensation reaction.

15. A process for producing polyester resin particles, which comprises subjecting polyester particles obtained by the process for producing polyester particles as defined in claim 1 to solid phase polycondensation reaction.

16. Polyester resin particles, obtained by the production process defined in claim 15.

17. Polyester particles which have an intrinsic viscosity of from 0.20 to 0.40 dL/g, which have a substantially cylindroid shape and which have a length of from 0.5 to 2.5 mm and a cut surface with a major axis and a minor axis of from 0.5 to 2.5 mm and from 0.3 to 2 mm, respectively.

18. The polyester particles according to claim 12, wherein the polyester is a polyethylene terephthalate and/or a polybutylene terephthalate.

19. Polyester resin particles, which have an intrinsic viscosity of at least 0.70 dL/g, which have a substantially cylindroid shape and which have a length of from 0.5 to 1.5 mm and a cut surface with a major axis and a minor axis of from 0.5 to 1.5 mm and from 0.3 to 1.2 mm, respectively.

20. The polyester resin particles according to claim 19, wherein the polyester is a polyethylene terephthalate and/or a polybutylene terephthalate.

* * * * *